(12) United States Patent
Streng

(10) Patent No.: US 8,371,246 B1
(45) Date of Patent: Feb. 12, 2013

(54) DEVICE FOR DRYING PETS

(75) Inventor: Marissa Streng, Indian Rocks Beach, FL (US)

(73) Assignee: MTS Innovations, LLC, Indian Rocks Beach, FL (US)

( * ) Notice: Subject to any disclaimer, the term of this patent is extended or adjusted under 35 U.S.C. 154(b) by 22 days.

(21) Appl. No.: 13/039,916

(22) Filed: Mar. 3, 2011

(51) Int. Cl.
*A01K 13/00* (2006.01)
(52) U.S. Cl. ......... 119/606; 119/678; 119/668; 119/671
(58) Field of Classification Search ................... 119/602, 119/603, 604, 614, 616, 665, 668, 671, 677, 119/678, 606, 654, 725, 850, 856
See application file for complete search history.

(56) References Cited

U.S. PATENT DOCUMENTS

| | | | | | |
|---|---|---|---|---|---|
| 3,108,568 | A | * | 10/1963 | Whitney et al. | 119/174 |
| 3,263,653 | A | * | 8/1966 | Miller | 119/673 |
| 3,749,064 | A | * | 7/1973 | Weinstein et al. | 119/664 |
| 4,144,845 | A | * | 3/1979 | Sneider | 119/678 |
| 4,718,375 | A | * | 1/1988 | Krieger | 119/678 |
| 5,060,597 | A | * | 10/1991 | Fredericks | 119/678 |
| 6,234,117 | B1 | * | 5/2001 | Spatt | 119/850 |
| 6,520,120 | B1 | | 2/2003 | Arnold et al. | |
| 6,595,162 | B1 | * | 7/2003 | Hibbert | 119/850 |
| 2008/0314330 | A1 | | 12/2008 | Tarasuk et al. | |
| 2012/0199082 | A1 | * | 8/2012 | Dick | 119/850 |

FOREIGN PATENT DOCUMENTS

FR 2520608 A1 * 2/1982

* cited by examiner

*Primary Examiner* — Rob Swiatek
*Assistant Examiner* — Lisa Tsang
(74) *Attorney, Agent, or Firm* — Ronald E. Smith; Smith & Hopen, P.A.

(57) ABSTRACT

A pet-drying device including a flexible sheet material having four openings formed therein for receiving the legs of a four-legged animal. Each opening seals around the perimeter of a pet's leg. The sheet material includes first and second longitudinally disposed edges and first and second transversely disposed edges. A first hem in the first longitudinally disposed edge receives a first drawstring for loosely tightening the sheet material around the neck and a second hem in the second longitudinally disposed edge receives a second drawstring that tightens around the tail. The first and second transversely disposed edges are secured to one another with a releasable fastener when the device is wrapped into a tubular configuration around the trunk of a pet. Warm air from a hair dryer is delivered to the inside of the sheet material through an elongate hose that engages a large diameter opening formed in the sheet material.

4 Claims, 4 Drawing Sheets

DEVICE FOR DRYING PETS

BACKGROUND OF THE INVENTION

1. Field of the Invention

This invention relates, generally, to a pet-drying appliance. More particularly, it relates to a garment worn by a pet during a hair or fur drying operation.

2. Description of the Prior Art

Most people use a towel to dry their dog or cat after a bath. However, this method usually results in a pet that is somewhat but far from completely dry.

Inventors have developed various devices designed to produce results that are superior to the results obtainable from towel-drying. However, many of the known devices include cage-like structures that can frighten a pet. Moreover, the known devices are loud in operation and thus add to the fear of the animal. After a first use, most animals are reluctant to enter such devices a second time and that makes it very difficult for an owner to get them inside the cage again. The cage devices are also large, difficult to store, and expensive.

Thus there is a need for a pet-drying device that does not strike fear into the pet.

There is also a need for a drying device that does not produce loud noises.

Another need exists for a device that a pet will use on a consistent basis without resistance.

However, in view of the art considered as a whole at the time the present invention was made, it was not obvious to those of ordinary skill in the art how the needed structure could be provided.

SUMMARY OF THE INVENTION

The long-standing but heretofore unfulfilled need for a device that dries pets without frightening them or making them uncomfortable is now met by a new, useful, and nonobvious invention.

The novel pet-drying device includes a flexible sheet material having four openings formed therein for receiving the legs of a four-legged animal. Each of the openings is relatively small in diameter when in repose so that it seals around the perimeter of a pet's leg. Each of the openings is lined with a strip of elastic material so that the opening can expand when occupied by a leg having a breadth that exceeds the breadth of the opening when in repose.

The sheet material includes a first longitudinally disposed edge, a second longitudinally disposed edge, a first transversely disposed edge, and a second transversely disposed edge. A first hem is formed in the first longitudinally disposed edge and is adapted to receive a first drawstring. A second hem is formed in the second longitudinally disposed edge and is adapted to receive a second drawstring.

A first fastener is secured to the device along the extent of the first transversely disposed edge, and a second fastener is secured to the device along the extent of the second transversely disposed edge on an opposite side of the device. The second fastener releasably engages the first fastener so that the first and second fasteners releasably engage one another along their respective extents when the device is wrapped into a generally tubular configuration around the trunk of a pet.

A large diameter opening is formed in the sheet material. An elongate, flexible hose has a first end adapted to be connected to a source of warm air. The source of warm air further includes a fan for propelling the warm air away from the source of warm air.

The source of warm air, which may be advantageously provided by a hand-held hair dryer, has an output of tubular configuration.

The elongate flexible hose has a second end adapted for fluid communication with the large diameter opening. The second end of the hose having a small opening formed therein that is lined with a strip of elastic material. The small opening has a small diameter when the strip of elastic material is in repose and said small opening is adapted to receive the tubular outlet of the source of warm air. The strip of elastic material engages the tubular outlet when the small opening engages the tubular outlet.

Accordingly, the tubular outlet of the source of warm air is inserted into the small opening and the elastic band fits snugly around it. The elasticity of the elastic band enables the small opening to accommodate hair driers having tubular outputs of varying diameters.

The hose is elongate so that the source of warm air and said fan may be operated at a distance away from the pet to reduce the noise of said fan.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which.

DETAILED DESCRIPTION OF THE PREFERRED EMBODIMENT

Figure 1:
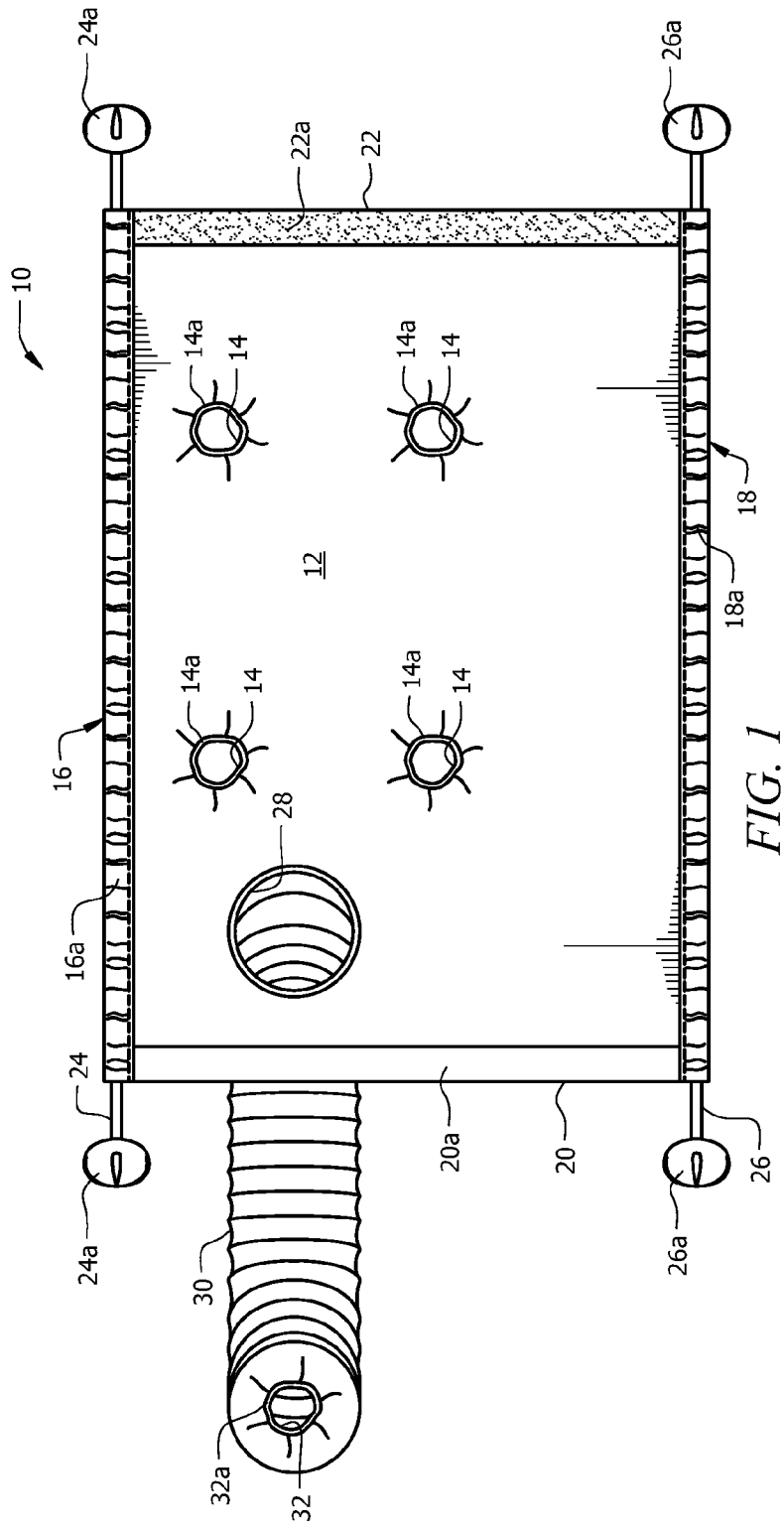
FIG. 1 is a first plan view of the novel structure, depicting the inside thereof.

FIG. 1 depicts an illustrative embodiment of the novel structure which is denoted as a whole by the reference numeral 10. The view of FIG. 1 depicts the interior side of the device.

Pet-drying device 10 is formed of a flexible, cloth or cloth-like rectangular sheet material 12 having four openings formed therein, collectively denoted 14, for receiving the legs of a four-legged animal such as a dog, cat, or other pet. Each opening 14 is relatively small in diameter when in repose so that it seals around the perimeter of a pet's leg. Each opening 14 is lined with a strip of elastic material 14a so that the opening can expand in the plane of sheet material 12 when occupied by a leg having a breadth that exceeds the breadth of the opening when in repose.

Sheet material 12 includes a first longitudinally disposed edge 16, a second longitudinally disposed edge 18, a first transversely disposed edge 20, and a second transversely disposed edge 22.

Hem 16a is formed in first longitudinally disposed edge 16 and receives drawstring 24. A stop member, depicted in the form of bell 24a, is attached to each end of drawstring 24. The diameter or breadth of bell 24a is greater than the diameter or breadth of hem 16a and is therefore sufficient to prevent it and hence drawstring 24 from being withdrawn into hem 16a. Hem 18a is formed in second longitudinally disposed edge 18 and receives drawstring 26. Each bell 26a also has a diameter or breadth sufficient to prevent it and hence drawstring 26 from being withdrawn into hem 18a. No bell is used in a preferred embodiment of the invention. Any item, including a knot, positioned at opposite ends of the drawstring that has a breadth that exceeds the breadth of its associated hem is acceptable.

Figure 3:
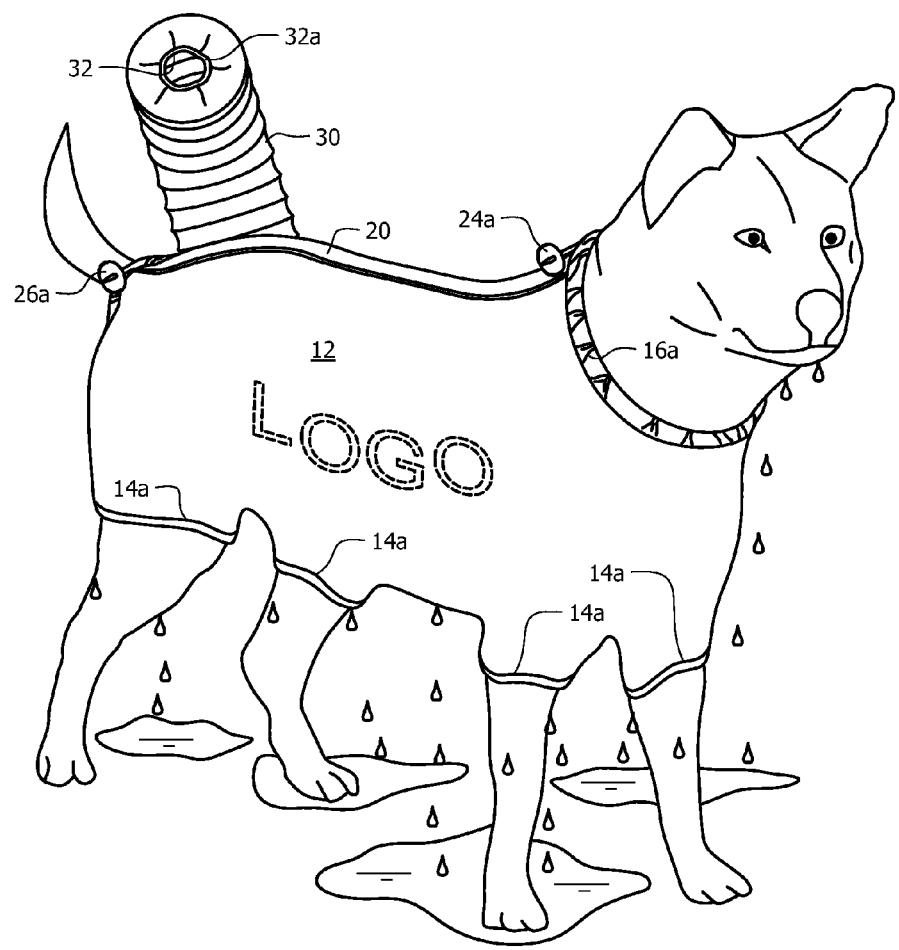
FIG. 3 is a front perspective view of the device before it is inflated.
Figure 4:
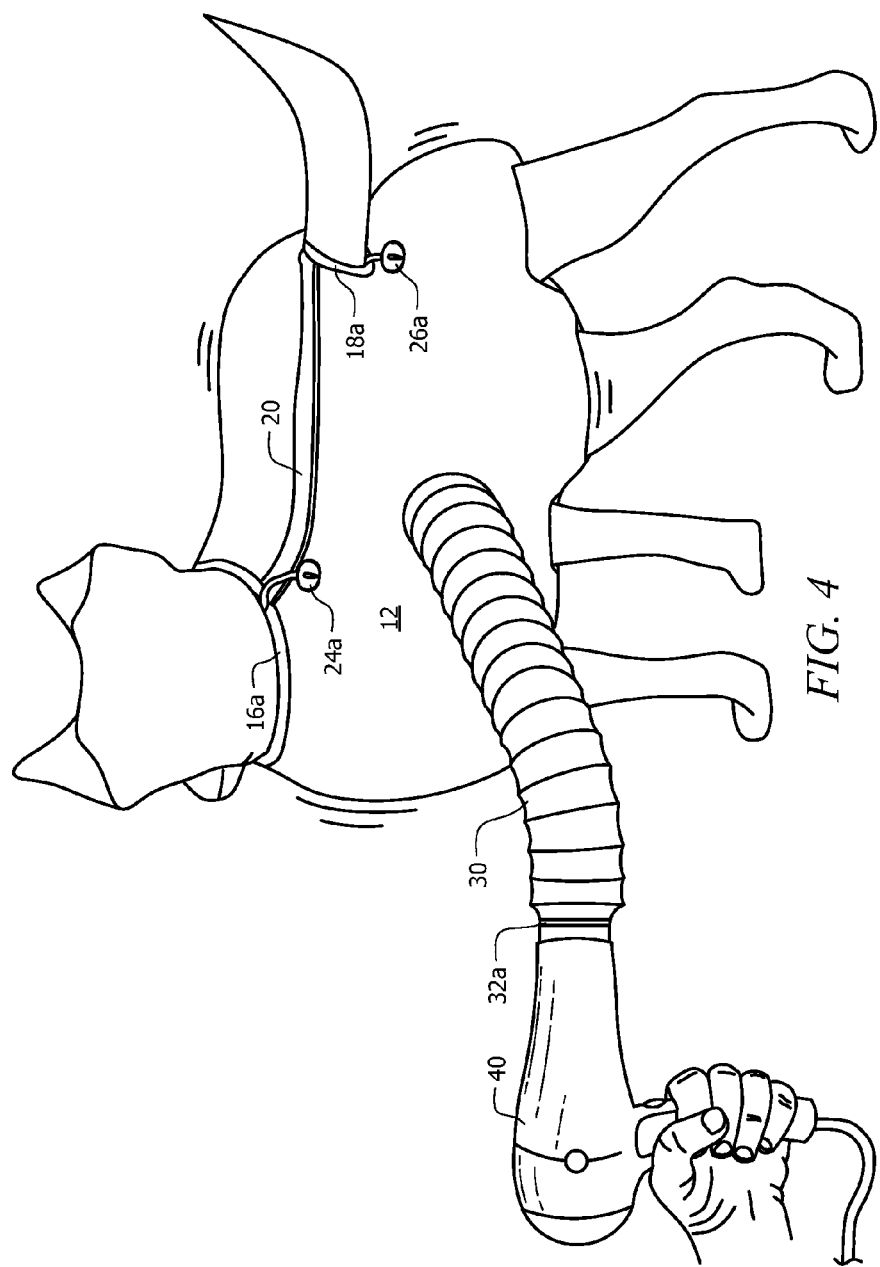
FIG. 4 is a rear perspective view of the device in its inflated configuration.

A strip of hook and loop fasteners 20a is secured to device 10 along the extent of first transversely disposed edge 20. A mating strip of hook and loop fasteners 22a is secured to device 10 along the extent of second transversely disposed edge 22, on the opposite side of device 10 so that fasteners 20a and 22a releasably engage one another along their respective extents when device 10 is wrapped into a generally tubular configuration as depicted in FIGS. 3 and 4.

Other releasable fastening means are also within the scope of this invention. For example, the hook and loop fasteners could be replaced with a zipper, snaps and buckles, and the like. Such longitudinally disposed fastening means could even be entirely obviated in favor of one or more additional transversely disposed, hem-occupying drawstrings arrayed along the length of the pet's body, although such arrangement might provide too much venting and thus slow down the drying process.

Figure 2:
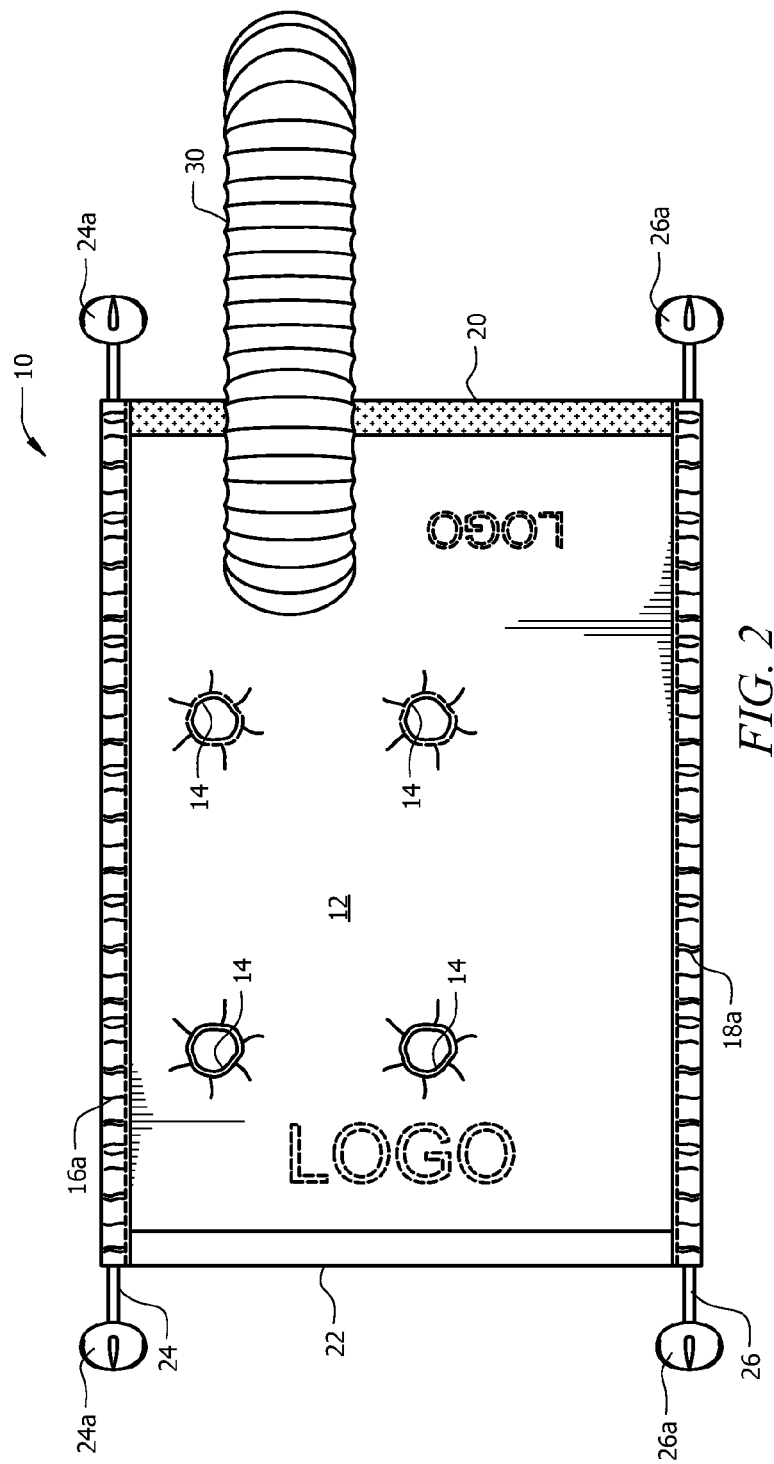
FIG. 2 is a second plan view of the novel structure, depicting the outside thereof.

Large diameter opening 28 is also formed in sheet material 12 but its function is best understood in connection with FIG. 2.

As depicted in FIGS. 1 and 2, elongate, flexible hose 30 is in fluid communication with said large diameter opening 28. As depicted in FIG. 1, the free end of hose 30 has a small opening 32 formed therein and said small opening is lined with a strip of elastic material 32a. The diameter of opening 32 is relatively small when elastic material 32a is in repose.

The tubular outlet of a hand held hair dryer is inserted into opening 32 and elastic band 32a fits snugly around it. The elasticity of elastic band 32a enables small opening 32 to accommodate hair driers having tubular outputs of varying diameters.

Hose 30 is long so that the hair dryer that sends warm air through hose 30 to dry the pet may be operated at a distance away from the pet. This noise reduction is an important feature of the invention because it reduces the fear factor of the drying experience. The hose is of the flexible, bellows type so that it can be shortened and flattened for storage or packaging.

Device 10 in use is depicted in FIGS. 3 and 4. As depicted in FIG. 3, drawstring 24 inside hem 16a has been drawn to tighten device 10 lightly about the neck of a pet and as depicted in FIG. 4, drawstring 26 inside hem 18a has been tightened around the tail of the pet. The device is uninflated in FIG. 3 and is inflated and working to dry the pet's fur in FIG. 4. The tubular outlet of hand-held hair dryer 40 is inserted into opening 32 and elastic strip 32a secures hose 30 to said tubular part.

Hot air can vent into the ambient atmosphere under both drawstrings and the leg-openings as well because the device is not air-tight. The size of the device exceeds the size of the pet with which it will be used so that when inflated as in FIG. 4, there is ample clearance space inside the device for hot air to circulate.

Removal of the device is just as easy as putting it on. The hook and loop fasteners are easily pulled apart, the drawstrings are easily loosened and the pet's legs are easily lifted out of the leg holes. If the pet owner is unsure as to whether or not the pet is completely dry during the drying process, it is a simple matter to partially loosen the hook and loop fasteners to feel the fur during the drying procedure.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A pet-drying device, comprising:
   a flexible sheet material of rectangular configuration having four openings formed therein for receiving the legs of a four-legged animal;
   each of said four openings being relatively small in diameter when in repose so that each opening of said four openings seals around a perimeter of a pet's leg;
   each of said openings of said four openings being lined with a strip of elastic material so that each opening of said four openings can expand in a plane of said sheet material when occupied by a pet's leg having a breadth that exceeds a breadth of each opening of said four openings when in repose;
   said sheet material including a first longitudinally disposed edge, a second longitudinally disposed edge parallel to said first longitudinally disposed edge, a first transversely disposed edge, and a second transversely disposed edge parallel to said first transversely disposed edge;
   a first hem formed in said first longitudinally disposed edge, said first hem adapted to receive a first drawstring;
   a second hem formed in said second longitudinally disposed edge, said second hem adapted to receive a second drawstring;
   a first fastener secured to said device along an extent of said first transversely disposed edge;
   a second fastener secured to said device along an extent of said second transversely disposed edge on an opposite side of said device;
   said second fastener releasably engaging said first fastener so that said first and second fasteners releasably engage one another along their respective extents when said device is wrapped into a generally tubular configuration about the trunk of a pet;
   a fifth opening formed in said sheet material;
   a flexible hose;
   said flexible hose having a first end adapted to be connected to a source of warm air including a fan for blowing said warm air and a second end that releasably engages said fifth opening.

2. The pet-drying device of claim 1, further comprising:
   said source of warm air having an outlet of tubular configuration;
   said first end of said hose having a small opening formed therein;
   said small opening of said first end of said hose being lined with a strip of elastic material;

said small opening of said first end of said hose having a small diameter when said strip of elastic material is in repose;

said small opening of said first end of said hose adapted to receive said outlet of tubular configuration of said source of warm air, said strip of elastic material engaging said outlet of tubular configuration;

whereby said outlet of tubular configuration of said source of warm air is inserted into said small opening of said first end of said hose and said strip of elastic material fits snugly around said outlet of tubular configuration;

whereby the elasticity of said strip of elastic material enables said small opening of said first end of said hose to accommodate hair driers having outputs of tubular configuration of varying diameters.

3. The pet-drying device of claim 1, further comprising:
said hose being elongate and flexible so that the source of warm air and said fan may be operated at a distance away from the pet to reduce noise produced by said fan.

4. The pet-drying device of claim 1, further comprising:
a first stop member secured to opposite ends of said first drawstring;
a second stop member secured to opposite ends of said second drawstring;
said first and second stop members having first and second breadths, respectively, that exceed first and second breadths of said first and second hems, respectively, so that said opposite ends of said first and second drawstrings cannot enter into said first and second hems.

* * * * *